United States Patent [19]
Balling et al.

[11] Patent Number: 5,275,230
[45] Date of Patent: Jan. 4, 1994

[54] REGENERATIVE PREHEATER AND METHOD FOR OPERATING THE SAME

[75] Inventors: Lothar Balling, Fürth; Klaus Hüttenhofer, Heroldsberg, both of Fed. Rep. of Germany

[73] Assignee: Siemens Aktiengesellschaft, Munich, Fed. Rep. of Germany

[21] Appl. No.: 846,285

[22] Filed: Mar. 4, 1992

[30] Foreign Application Priority Data

Mar. 4, 1991 [DE] Fed. Rep. of Germany ....... 4106837

[51] Int. Cl.[5] .................... F28D 19/00; B01D 53/36
[52] U.S. Cl. ........................................ 165/7; 422/173; 422/175; 422/177; 422/209
[58] Field of Search ............... 165/7; 422/209, 178, 422/223, 175, 173, 181, 177

[56] References Cited

U.S. PATENT DOCUMENTS

| | | | |
|---|---|---|---|
| 4,678,643 | 7/1987 | Fetzer | 422/178 |
| 4,836,988 | 6/1989 | Kristof et al. | 422/175 |
| 5,145,652 | 9/1992 | Veser et al. | 422/173 |

FOREIGN PATENT DOCUMENTS

| | | |
|---|---|---|
| 0195075 | 5/1989 | European Pat. Off. |
| 3431730 | 3/1986 | Fed. Rep. of Germany. |
| 8424417 | 8/1986 | Fed. Rep. of Germany. |
| 3335917 | 12/1986 | Fed. Rep. of Germany. |
| 3805791 | 8/1989 | Fed. Rep. of Germany. |

OTHER PUBLICATIONS

Publication: Chem.-Ing.-Tech. 58 (1986) No. 8, pp. 617-623: (Kotter et al).

*Primary Examiner*—Albert W. Davis, Jr.
*Attorney, Agent, or Firm*—Herbert L. Lerner; Laurence A. Greenberg

[57] ABSTRACT

A regenerative preheater includes a heat accumulator and a catalyst through which a raw gas containing a harmful component can flow and through which a clean gas can flow in alternation. A first admission point for a gaseous reagent is disposed upstream of the catalyst in a flow path of the raw gas. A second admission point for the gaseous reagent is disposed upstream of the catalyst in a flow path of the clean gas. A method for operating a regenerative preheater includes passing a raw gas containing a harmful component and passing a clean gas through a heat accumulator and a catalyst in alternation. A a reagent for a catalytic reaction is introduced into both a flow path of the raw gas and a flow path of the clean gas.

33 Claims, 4 Drawing Sheets

REGENERATIVE PREHEATER AND METHOD FOR OPERATING THE SAME

The invention relates to a regenerative heat exchanger or a so-called regenerative preheater with a built-in catalyst. The invention also relates to a method for operating such a regenerative preheater. The invention can be used for both air preheaters and gas preheaters.

The fact that a selective catalytic reaction (SCR) catalyst can be built into a regenerative heat exchanger is known. It is known, in particular, from Published European Application No. 0 172 246 B1, that the reagent, and predominantly the reducing agent ammonia ($NH_3$), can be added on the raw gas side, the flue gas side or the exhaust gas side, and from German Published, Non-Prosecuted Application DE 34 31 730 A1, corresponding to Published European Application No. 0 195 075 B1, it can be learned that the reducing agent can be added on the clean gas or air side. In the one case, the ammonia is admixed with the flue gas before it enters the catalyst, and in the other case it is mixed with the fresh air to be heated before it enters the catalyst. In both cases, the toxic components, specifically $NO_x$, contained in the flue gas are catalytically converted by the SCR process into harmless components.

When ammonia is added on the flue gas side, the following problem arises: the ammonia and the problematic harmful components $NO_x$ remain for too short a time in the catalyst, so that only an inadequate reaction takes place there. Unused ammonia is thereby passed onto the side of the cleaned flue gas that leads to the chimney. This "slippage", that is the passage of unused reagent, should be lessened, because when it is discharged through the chimney there is a burden on the environment.

In the other case as well, namely when the ammonia is added on the air side, problems arise: as a rule, some leakage occurs; that is, despite seals having been provided, a certain amount of ammonia escapes from the clean gas side to the side of the cleaned flue gas and is thus lost, and also burdens the downstream parts of the system. Moreover, more detailed analysis of the catalytic performance shows that with a typical oncoming flow of the catalyst from the bottom, relatively little ammonia is stored in the upper part of the catalyst, yet it is precisely this upper part of the catalyst that is exposed to the raw gas having the high concentration of pollutants. The result is a relatively low reduction rate for the pollutants.

It can accordingly be stated that since all regenerative heat exchangers have a certain slippage or drift from the air side to the flue gas side, depending on the interconnections and structure, the reagent or reducing agent also reaches the side of the cleaned flue gas in undesirable unreacted form. If the system is disadvantageously constructed, up to 5% of the reducing agent can reach the side of the cleaned flue gas, which means a flow of up to 10 mg/m$^3$ of $NH_3$. A substantial reduction of this $NH_3$ slippage and the associated problems of contamination and corrosion is desirable. Moreover, it is desirable to store as much $NH_3$ as possible in the catalyst for the reaction with the harmful components of the raw gas.

It is accordingly an object of the invention to provide a regenerative preheater and a method for operating the same, which overcome the hereinafore-mentioned disadvantages of the heretofore-known methods and devices of this general type, which include a heat accumulator and a catalyst that have a flow-through of a raw gas containing a harmful component and a clean gas in alternation, and wherein a reagent is introduced into a flow path for the sake of a catalytic reaction, in such a way that the slippage is reduced and the reaction rate of the catalyst is increased.

With the foregoing and other objects in view there is provided, in accordance with the invention, a regenerative preheater, comprising a heat accumulator and a catalyst through which a raw gas (e.g., flue gas) containing a harmful component (e.g., $NO_x$) can flow and through which a clean gas (e.g., air) can flow in alternation; a first admission point for a gaseous reagent (e.g., $NH_3$) being disposed upstream of the catalyst in a flow path of the raw gas; and a second admission point for the same gaseous reagent being disposed upstream of the catalyst in a flow path of the clean gas.

In accordance with another feature of the invention, in a first basic embodiment, the second admission point is disposed in such a way that the reagent can be admixed with the entire flow of clean gas.

In accordance with a further feature of the invention, the second admission point includes a network of a plurality of feed points for the reagent, and the network is disposed transversely to the flow path of the clean gas.

In accordance with an added feature of the invention, in a second basic embodiment, the second admission point includes at least one outlet opening, which is disposed in a sectional channel through which the clean gas can flow.

In accordance with an additional feature of the invention, in a third basic embodiment, the second admission point includes a network of a plurality of feed points for the reagent, which network is disposed transversely to the flow path of the clean gas, and at least one outlet opening for the reagent, which opening is disposed in a sectional channel through which the clean gas can flow. In other words, this embodiment combines the first and second basic embodiments.

In accordance with yet another feature of the invention, the sectional channel is narrower than the diameter of the flow path of the clean gas and extends substantially over the entire diameter of the flow path of the clean gas.

In accordance with yet a further feature of the invention, the sectional channel is disposed immediately upstream of the heat accumulator or the catalyst.

In accordance with yet an added feature of the invention, there are provided seals disposed between the flow paths for the raw gas and the clean gas, the sectional channel being spaced apart from the seals.

In accordance with yet an additional feature of the invention, there is provided a tube, preferably having a rectangular cross section, extending in the sectional channel and having a plurality of outlet openings over its length for the reagent.

In accordance with again another feature of the invention, there is provided a centrally located connection for the reagent being connected to the tube.

In accordance with again a further feature of the invention, there are provided incrementally or continuously rotatable hoods associated with the heat accumulator and the catalyst.

In accordance with again an added feature of the invention, there are provided hoods between which the heat accumulator and the catalyst are incrementally or continuously rotatable.

In accordance with again an additional feature of the invention, the catalyst is also constructed as a heat accumulator.

In accordance with still another feature of the invention, the heat accumulator is subdivided into a number of sectional heat accumulators and the catalyst is subdivided into a number of sectional catalysts, through which the raw gas and the clean gas can flow in alternation, and there are preferably provided flaps for diverting the two gas flows.

In accordance with still a further feature of the invention, there is provided a reagent source, and valves connected between the reagent source and the admission points for the reagent, the valves being preferably controlled in accordance with a specification of at least one parameter, such as the raw gas.

In accordance with still an added feature of the invention, the reagent supplied to the clean gas and the reagent supplied to the raw gas are in a ratio which is greater than substantially 0.5, such as substantially between 60% and 40%.

In accordance with still an additional feature of the invention, the preheater is an air preheater.

In accordance with another feature of the invention, the raw gas is a flue gas being furnished from a combustion plant and having $NO_x$ harmful components, the clean gas is air, and the reagent is ammonia.

In accordance with a further feature of the invention, the preheater is a gas preheater.

In accordance with an added feature of the invention, the raw gas is a flue gas being furnished from a combustion plant and having $NO_x$ harmful components, the clean gas is the flue gas being partially free of the $NO_x$ harmful components, and the reagent is ammonia.

With the objects of the invention in view, there is also provided a method for operating a regenerative preheater, which comprises passing a raw gas containing a harmful component and passing a clean gas through a heat accumulator and a catalyst in alternation, and introducing a reagent for a catalytic reaction into both a flow path of the raw gas and a flow path of the clean gas.

The introduction is preferably adjusted as needed through valves. As compared with the known method, wherein the reagent is introduced solely into the flow path of the clean gas, it proves advantageous to reduce the slippage, since less reagent has to be introduced on the clean gas side. There is also the advantage of a higher reaction rate, since the catalyst is enriched with reagent from the flue gas side and also preferably in the upper part.

In accordance with a concomitant mode of the invention, there is provided a method which comprises admixing the reagent with the clean gas over approximately the entire cross section of the flow path of the clean gas and/or over a limited sectional channel of the flow path of the clean gas.

Other features which are considered as characteristic for the invention are set forth in the appended claims.

Although the invention is illustrated and described herein as embodied in a regenerative preheater and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
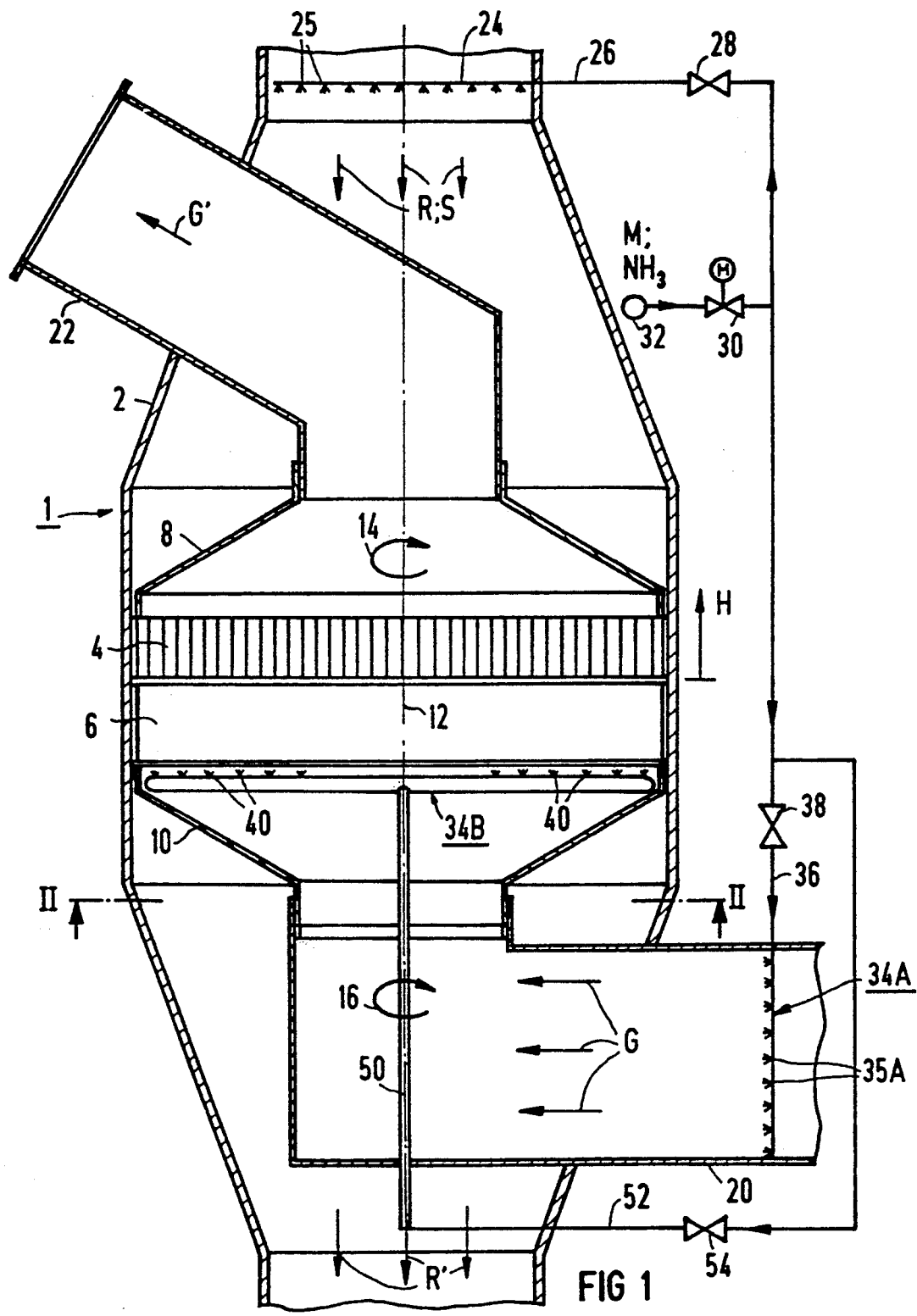
FIG. 1 is a fragmentary, diagrammatic, sectional view of a regenerative preheater with a catalyst according to the invention, in which a first admission point and a double second admission point are provided for a gaseous reagent.

Referring now to the figures of the drawing in detail and first, particularly, to FIG. 1 thereof, there is seen a sectional view of a regenerative preheater 1 of a largely conventional type, which is constructed as an air preheater. This preheater 1 includes a housing 2, into which hot raw gas R, laden with a harmful component S, flows from above. This raw gas R is furnished by a non-illustrated combustion plant. In particular, it is flue gas that is laden with nitrogen oxides $NO_x$ as the harmful components S. This raw gas R leaves the preheater 1 at the lower end in cleaned, cooled form. The cooled raw gas is identified by reference symbol R'.

In an installed and fixed state, an SCR catalyst 4 and a downstream heat accumulator 6 are disposed in a middle portion of the housing 2. On either side of this configuration 4, 6 are respective segmented hoods 8 and 10, which are rotatable in common about a vertical axis 12. This is indicated by respective curved arrows 14 and 16. The rotation may be performed incrementally or continuously. As a consequence of the rotation, continuously different parts of the catalyst 4 are exposed to the hot, pollutant-laden raw gas R.

An L-shaped inflow line 20 for clean gas G, which is centrally connected to the hood 10, leads into a lower path of the housing 2. The clean gas G is heated in the heat accumulator 6. The clean gas G then leaves an upper part of the housing 2 at the side in the form of hot clean gas G' through the catalyst 4, the hood 8 and an offset-bent outlet line 22. The gas G may in particular be air, which is intended to be heated before being delivered to a burner.

A significant factor is that a first admission point 24 for a gaseous reagent M is provided in the flow path of the raw gas R upstream of the catalyst 4. This reagent may in particular be the reducing agent ammonia ($NH_3$). Typically, ammonia is used in deNO$_x$ catalysts that operate by the SCR process. The first admission point 24 is a network of many feed points or holes 25, and it is supplied from a reagent source 32 through one or more inflow lines 26 and valves 28 as well as an adjustable control valve 30. The entire network can be seen in the upper part of the housing 2 to be disposed transversely to the flow path of the raw gas R.

A second admission point 34A for the same gaseous reagent M, such as $NH_3$, is also provided. This second admission point 34A is located in the flow path of the clean gas G upstream of the catalyst 4. In the present case the second admission point 34A is in the inflow line 20. With respect to the second admission point 34A, care is taken in the present case to ensure that the reagent M can be admixed with the entire flow of clean gas G by way of the second admission point 34A. This is why the second admission point 34A is likewise constructed as a network that has a plurality of feed points or holes 35A for the reagent M. This network is disposed transversely to the flow path of the clean gas G.

The second admission point 34A is supplied from the source 32 through one or more lines 36 and valves 38 and through the control valve 30. With the aid of the valves 28, 38, the ratio between the reagent M supplied to the clean gas G and the reagent M supplied to the raw gas R can be set. Experiments have shown that this ratio should be greater than 0.5 and, for example, it may amount to between 60% and 40%. The total quantity per unit of time of reagent M supplied can be set with the aid of the control valve 30.

It has already been emphasized that in the present case the reagent M is introduced both into the flow path of the raw gas R and into the flow path of the clean gas G. The success and effect of this provision can be seen from FIG. 3. In this case, the concentration c of ammonia ($NH_3$) in the catalyst 4 is plotted over the height of the catalyst 4. A curve p refers to the enrichment of $NH_3$ in the catalyst because of the delivery through the clean gas G. Subsequently, a high concentration c is found in the lower region, that is close to where $H=0$. In contrast, a curve q relates to the enrichment of ammonia through the admission with the raw gas R. Subsequently, a higher concentration c in the upper region of the catalyst 4 is found. A curve r resulting from the two provisions represented by the curves p, q shows that in this way a nearly constant supply of reagent M, in the present case $NH_3$, over the height H of the catalyst 4 can be attained. Due to this supply of $NH_3$ (which is increased as compared with the prior art), a higher conversion rate for the pollutant gas $NO_x$ is obtained. It is important to add only so much $NH_3$ to the raw gas side to ensure that no slippage occurs. That is, at the height $H=0$, the $NH_3$ concentration should be equal to 0. This admission can be adjusted through the valve 28. The shaded zone corresponds to admission through the raw gas side.

Figure 3:
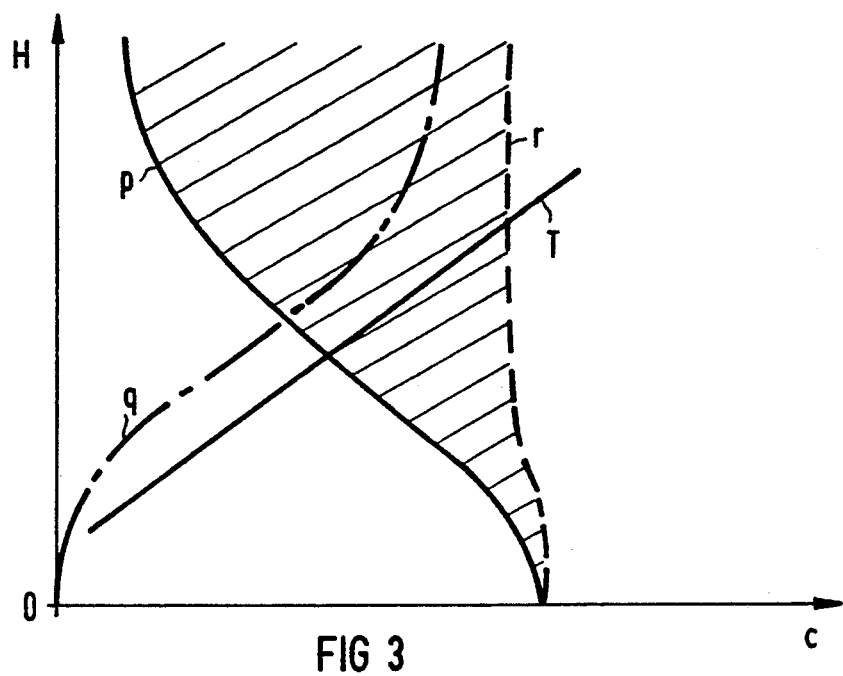
FIG. 3 is a diagram in which the concentration c of the stored reagent $NH_3$ is plotted over the height H of the catalyst.

FIG. 3 also schematically shows the course of temperature T over the height H. As can be seen, a higher temperature prevails in upper region of the catalyst 4 than in the lower region. The higher the temperature T, the greater the conversion activity. By increasing the $NH_3$ concentration in the catalyst 4 in accordance with the curve q, the upper region of the catalyst 4 is thus involved especially for catalytic conversion, as compared with the curve p.

Figure 2:
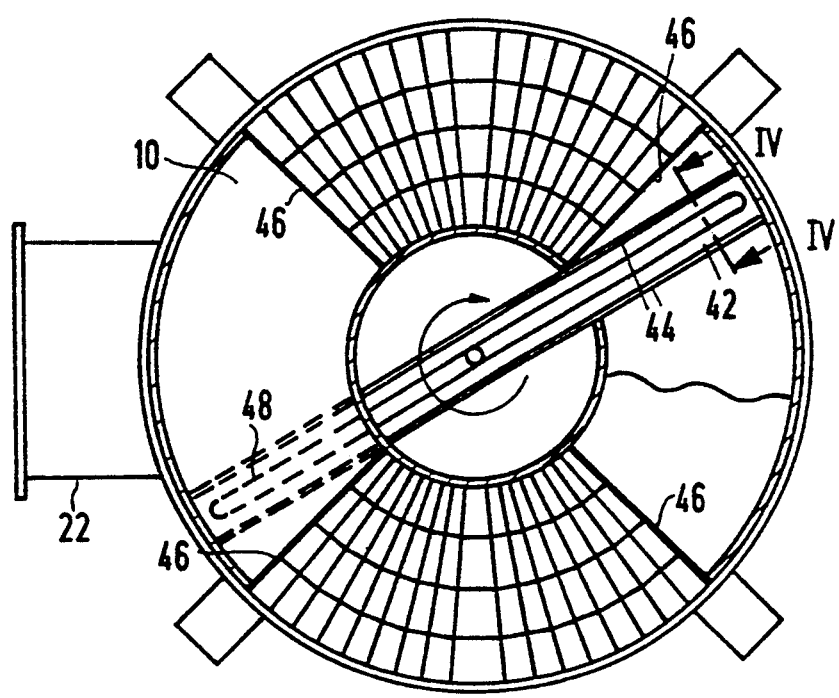
FIG. 2 is a sectional view taken along the line II—II in the regenerative preheater of FIG. 1, in the direction of the arrows.

In FIGS. 1 and 2, a second variant (basic embodiment) for the second admission point is also shown. This second variant is identified by reference symbol 34B. This second admission point 34B includes a number of outlet openings 40 for the reagent M, which are disposed in a sectional channel 42 through which the clean gas G flows. According to FIGS. 1 and 2, a combination of the first and second variants 34A and 34B is possible. Naturally, the two variants 34A, 34B can also each be made separately.

Figure 4:
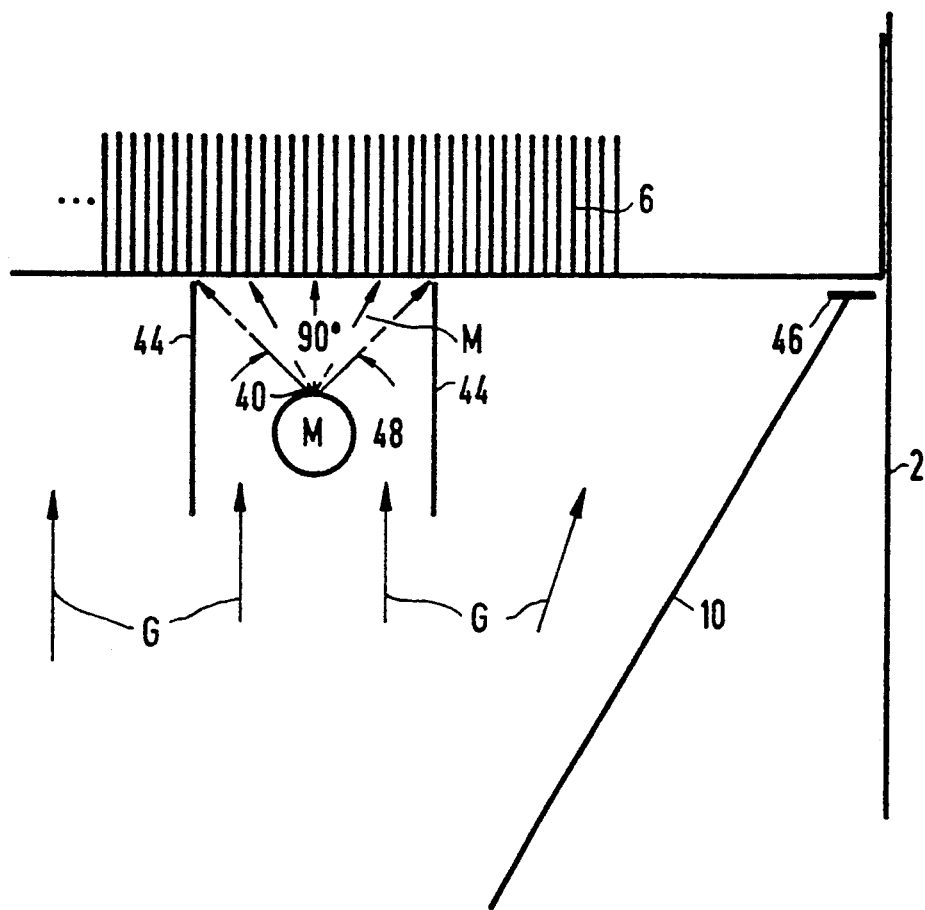
FIG. 4 is an enlarged sectional view taken along the line IV—IV in the regenerative preheater of FIG. 2 in the direction of the arrows, which illustrates the second basic embodiment of the second admission point.

It can be seen from FIGS. 2 and 4 that the sectional channel 42 is formed substantially of two parallel metal sheets or walls 44 extending approximately radially in the upper part of the hood 10. The sectional channel 42 is narrow as compared with the diameter of the flow path of the clean gas G in the inflow line 20 and it extends over substantially the entire diameter of this conically flaring flow path inside the hood 10. From FIG. 1 it can be seen that the sectional channel 42 is disposed immediately upstream of the heat accumulator 6. FIG. 2 shows that the sectional channel 42 is spaced apart from seals 46, which are disposed between the flow paths for the flue gas R and the clean gas G. These seals 46 are lips or cleats. The sectional channel 42 has a rectangular cross section. A horizontally disposed tube 48, which has the aforementioned outlet openings 40, extends in the sectional channel 42 over the entire width. This tube 48 is closed on both ends and is supplied centrally with reagent M from a vertical delivery tube or centrally located connection 50. Once again, the supply is effected from the reagent source 32, through a line 52 and a valve 54 and through the adjusting valves 30. The tube 50 can thus be considered a central connection for the reagent $NH_3$.

Figure 5:
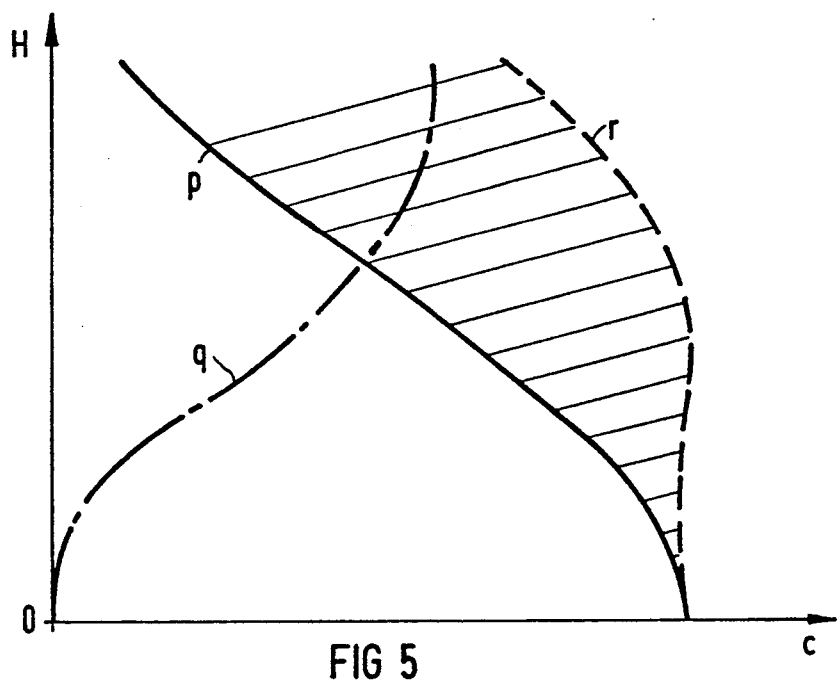
FIG. 5 is an associated diagram in which the concentration c of the stored reagent $NH_3$ is plotted over the height H of the catalyst.

FIG. 4 illustrates on a larger scale that the tube 48 disposed in the sectional channel 42 outputs reagent M in the direction of the heat accumulator 6 and the catalyst 4 through its outlet openings 40. In the present case, an outlet angle of approximately 90° is used. FIG. 4 also shows that the sectional channel 42 receives only some of the entire clean gas flow G. In this case, a relatively high concentration of $NH_3$ is set. This means that with circulation between the two hoods 8 and 10 around the central axis 12 in the catalyst 4, continuously new segments of high $NH_3$ concentration are created in the form of strips. It is apparent from FIG. 5 that the $NH_3$ concentration is accordingly higher, at least in the lower region of the catalyst 4, than if the entire oncoming flow entered at one point. Once again, the curve p shows the $NH_3$ concentration c in the catalyst 4 over the height H when there is $NH_3$ admission on the air side. Once again, the $NH_3$ admission from the side of the raw gas R as represented by the curve q is adjusted in such a way that at $H=0$ practically no further $NH_3$ arrives. The combination of the curves p and q once again is the curve r. FIG. 5 shows that in this case as well, a largely constant $NH_3$ concentration prevails over the height H in the catalyst 4. In comparison with FIG. 3, it is substantially higher on average. The result is an even higher conversion rate of catalytic activity.

The second variant shown in FIGS. 2, 4 and 5 likewise makes use of the fact that the SCR catalyst 4 has a high capacity for $NH_3$. The reducing agent $NH_3$ is admitted from the raw gas and the clean gas side and it is adsorptively received by the catalyst 4. When the raw gas 4 passes through the catalyst, it then reacts with the $NO_x$. For example, it is abreacted (SCR process) with NO to make $N_2$ and $H_2O$. In order to load the catalyst 4 with $NH_3$, it suffices, as shown in FIGS. 2, 4 and 5, to present it with this $NH_3$ in a narrow region. The second variant is therefore based on the continuous admission of highly concentrated reducing agent into a very narrow region of the catalyst (which preferentially extends radially in FIG. 2). This region is preferentially partitioned off by the aforementioned metal sheets or walls 44 in such a way that in the region of the impact points or transitions between clean gas and raw gas, no $NH_3$ is present and thus no $NH_3$ can pass over. A further advantage is that the increased NH₃ concentration effects better saturation of the catalyst 4. Moreover, as compared with the first variant of the second admission point 34A, there is an advantage which is that the second admission point is structurally simpler and less expensive, because only a single radial tube 48 (rather than any network) is used. Another advantage is that there is no need to adjust the distribution.

It has been stated above that the hoods 8 and 10 are rotatable, while the configuration 4, 6 is fixed relative to the housing 2. The converse can also be true. In other words, the heat accumulator 6 and the catalyst 4 may be incrementally or continuously rotatable between corresponding but fixed hoods. Moreover, the heat accumulator and the catalyst can be combined. In other words, the catalyst can at the same time be constructed as a heat accumulator.

Another alternative is attained by providing that the heat accumulator is subdivided into a number of sectional heat accumulators, and the catalyst is subdivided into a number of sectional catalysts. The sectional heat accumulators and catalysts then have an alternating flow-through of raw gas and clean gas. Flaps can preferably be used to divert the two gas flows. With this kind of construction, it is accordingly also possible to make use of the simultaneous introduction of the reducing agent M into the flow path of the raw gas R and into the flow path of the clean gas G.

It has also been stated above that the present regenerative heat exchanger 1 shown in FIG. 1 may be an air preheater. In that case, the raw gas R is flue gas with $NO_x$ pollutant components, which is furnished from a combustion system, the clean gas G is air, and the reagent M is ammonia. A typical SCR catalyst is used as the catalyst 4. Alternatively, the preheater may be a gas preheater. In a typical application, the raw gas is then flue gas with $NO_x$ pollutant component which is furnished by a non-illustrated combustion system, while the clean gas G is the flue gas that is partially freed of the $NO_x$ pollutant components, and the reducing agent is again ammonia. Once again, a typical SCR catalyst is used in this case.

However, the invention is not limited to these applications. In principle, the process may be an oxidation process instead, for example using $CH_4$, in which the reagent is oxygen, $O_2$, or ozone, $O_3$.

In closing, it should also be pointed out that the various options for introducing the reagent M into the catalyst 4 (on the flue gas side, the clean gas side, or through a network and/or sectional channels) may be combined with one another in such a way that an optimal association of the NH₃ quantity is possible for every application and load situation (the temperature dependency of the NH₃ adsorption should be taken into account). Accordingly, a temperature-dependent adjustment of the valves 28, 38 and 54 may be provided, so that optimal conditions are attained for every operating situation. In particular, a change in the ratio of the throughputs in accordance with one or more parameters, for example that of the raw gas R, should be considered.

We claim:

1. A regenerative preheater, comprising:
   a heat accumulator and a catalyst through which a raw gas containing a harmful component can flow and through which a clean gas can flow in alternation;
   a first admission point for a gaseous reagent being disposed upstream of said catalyst in a flow path of the raw gas;
   a second admission point for the gaseous reagent being disposed upstream of said catalyst in a flow path of the clean gas; and
   a sectional channel through which the clean gas can flow at least partially, said second admission point including at least one outlet opening disposed in said sectional channel.

2. The regenerative preheater according to claim 1, wherein said second admission point includes a network of a plurality of feed points for the reagent, and said network is disposed transversely to the flow path of the clean gas.

3. The regenerative preheater according to claim 1, wherein said second admission point includes a network of a plurality of feed points for the reagent, said network being disposed transversely to the flow path of the clean gas, and at least one outlet opening for the reagent, said at least one outlet opening being disposed in said sectional channel.

4. The regenerative preheater according to claim 3, wherein said sectional channel is narrower than the diameter of the flow path of the clean gas and extends substantially over the entire diameter of the flow path of the clean gas.

5. The regenerative heater according to claim 3, wherein said sectional channel is disposed immediately upstream of one of said heat accumulator and said catalyst.

6. The regenerative preheater according to claim 3, including seals disposed between the flow paths for the raw gas and the clean gas, said sectional channel being spaced apart from said seals.

7. The regenerative preheater according to claim 3, including a tube extending in said sectional channel and having a plurality of outlet openings over its length for the reagent.

8. The regenerative preheater according to claim 7 wherein said sectional channel has a rectangular cross section.

9. The regenerative preheater according to claim 7, including a centrally located connection for the reagent being connected to said tube.

10. The regenerative preheater according to claim 1, wherein said sectional channel is narrower than the diameter of the flow path of the clean gas and extends substantially over the entire diameter of the flow path of the clean gas.

11. The regenerative preheater according to claim 1, wherein said sectional channel is disposed immediately upstream of one of said heat accumulator and said catalyst.

12. The regenerative preheater according to claim 1, including seals disposed between the flow paths for the raw gas and the clean gas, said sectional channel being spaced apart from said seals.

13. The regenerative preheater according to claim 1, including a tube extending in said sectional channel and having a plurality of outlet openings over its length for the reagent.

14. The regenerative preheater according to claim 13, wherein said sectional channel has a rectangular cross section.

15. The regenerative preheater according to claim 13, including a centrally located connection for the reagent; being connected to said tube.

16. The regenerative preheater according to claim 1, including incrementally rotatable hoods associated with said heat accumulator and said catalyst.

17. The regenerative preheater according to claim 1, including continuously rotatable hoods associated with said heat accumulator and said catalyst.

18. The regenerative preheater according to claim 1, including hoods between which said heat accumulator and said catalyst are incrementally rotatable.

19. The regenerative preheater according to claim 1, including hoods between which said heat accumulator and said catalyst are continuously rotatable.

20. The regenerative preheater according to claim 1, wherein said catalyst and said heat accumulator are constructed as one unit.

21. The regenerative preheater according to claim 1, wherein said heat accumulator is subdivided into a number of sectional heat accumulators and said catalyst is subdivided into a number of sectional catalysts, through which the raw gas and the clean gas can flow in alternation.

22. The regenerative preheater according to claim 21, including flaps for diverting the two gas flows.

23. The regenerative preheater according to claim 1, including a reagent source, and valves connected between said reagent source and said admission points for the reagent.

24. The regenerative preheater according to claim 23, wherein said valves are controlled in accordance with a specification of at least one parameter.

25. The regenerative preheater according to claim 24 wherein the at least one parameter relates to the raw gas.

26. The regenerative preheater according to claim 1, wherein the reagent supplied to the clean gas and the reagent supplied to the raw gas are in a ratio which is greater than substantially 0.5.

27. The regenerative preheater according to claim 1, wherein the reagent supplied to the clean gas and the reagent supplied to the raw gas are in a ratio which is substantially between 60% and 40%.

28. The regenerative preheater according to claim 1, wherein the raw gas is a flue gas being furnished from a combustion plant and having $NO_x$ harmful components, the clean gas is air, and the reagent is ammonia.

29. The regenerative preheater according to claim 1, wherein the clean gas is air.

30. The regenerative preheater according to claim 1, wherein the clean gas is a flue gas based on the raw gas which is now partially free of $NO_x$ harmful components.

31. The regenerative preheater according to claim 30 wherein the raw gas is a flue gas furnished from a combustion plant and having $NO_x$ harmful components and the reagent is ammonia.

32. A method for operating a regenerative preheater, which comprises passing a raw gas containing a harmful component and passing a clean gas through a heat accumulator and a catalyst in alternation, and introducing a reagent for a catalytic reaction into a flow path of the raw gas and into a flow path of the clean gas by admixing the reagent with the clean gas over a limited sectional channel of the flow path of the clean gas.

33. The method according to claim 32, which comprises admixing the reagent with the clean gas over approximately the entire cross section of the flow path of the clean gas and over a limited sectional channel of the flow path of the clean gas.

* * * * *